United States Patent [19]

Krebs et al.

[11] 4,345,548
[45] Aug. 24, 1982

[54] THROAT PROTECTOR

[76] Inventors: Clifton T. Krebs, Box 297, Vernon, British Columbia, Canada, V1T 6M2; Leonard B. Krebs, General Delivery, Fort Steele, British Columbia, Canada

[21] Appl. No.: 222,578

[22] Filed: Jan. 5, 1981

[51] Int. Cl.³ .................. A01K 29/00; B68C 5/00
[52] U.S. Cl. .................................. 119/108; 54/67; 54/80
[58] Field of Search ............... 119/108, 136, 142, 143, 119/129; 54/20, 59, 67, 79, 80

[56] References Cited

U.S. PATENT DOCUMENTS

| 186,597 | 1/1877 | Means | 119/142 X |
| 295,712 | 3/1884 | Anderson | 54/80 |
| 645,343 | 3/1900 | Weller et al. | 54/80 |
| 3,942,306 | 3/1976 | Kulka | 54/80 |
| 4,199,920 | 4/1980 | Hodges et al. | 54/67 X |

Primary Examiner—Gene Mancene
Assistant Examiner—Robert P. Swiatek
Attorney, Agent, or Firm—Beehler, Pavitt, Siegemund, Jagger & Martella

[57] ABSTRACT

A neck protector for an animal to be roped. The protector extends on the underside of the animal from between the fore-legs to adjacent the mouth. The protector extends partially around the neck of the animal to protect the windpipe during roping. It is attached round the body, head and neck on the animal.

5 Claims, 2 Drawing Figures

THROAT PROTECTOR

FIELD OF THE INVENTION

This invention relates to a neck protector for an animal.

DESCRIPTION OF THE PRIOR ART

In the roping of animals, particularly in a rodeo, considerable harm can be done to a young animal, usually a calf, by strangulation when the rope is tightened around its neck. The normal procedure is that the competitor in the rodeo rides after the animal, ropes it and the competitor's horse is then trained to pull back sharply on the rope bringing the roped animal, usually a calf, to a stop and possibly to the ground. The competitor then leaves the horse to tie the roped animal. The whole procedure is timed.

When the horse pulls backwardly on the rope the calf can be strangled and it is to avoid the unnecesssary injury to animals that the present invention has been devised.

In a rodeo event called team roping one member of a team, called the header, is mounted on a horse and ropes an animal around the neck. The other member of the team, called the heeler and also mounted on a horse, then ropes the rear legs of the animal as the header heads the animal from his horse. Again considerable force is exerted on the neck of the roped animal, usually a calf of 500 to 600 lbs.

SUMMARY OF THE INVENTION

The present invention accordingly seeks to provide a neck protector for an animal that permits an animal, particularly a calf, to be roped by the usual procedure in a rodeo and yet not in any way be harmed. The protector does not hinder movement of the animal.

Accordingly, in a first aspect, the present invention is a neck protector for an animal to be roped, the protector comprising a member to extend on the underside of the animal from between the fore-legs of the animal to adjacent the mouth, said member being able to extend partially around the neck of the animal to protect the windpipe during roping and attachment means whereby the member can be located on the animal.

In a preferred embodiment the protector may be a flexible material able to conform to the shape of the animal's neck. In a preferred embodiment the flexible material may be rubber or neoprene whose unstressed shape is a simple flat sheet. The protector is provided with straps to wrap around the animal and attach and the flexible material then protects the front of the animal's throat.

If required the protector may also be a relatively rigid material shaped to conform to the animal's neck but a disadvantage of this is that the protector of a rigid material is only useful with a certain size of animal.

BRIEF DESCRIPTION OF THE DRAWING

Aspects of the invention are illustrated, merely by way of example, in the accompanying drawing in which.

DESCRIPTION OF THE PREFERRED EMBODIMENT

Figure 2:
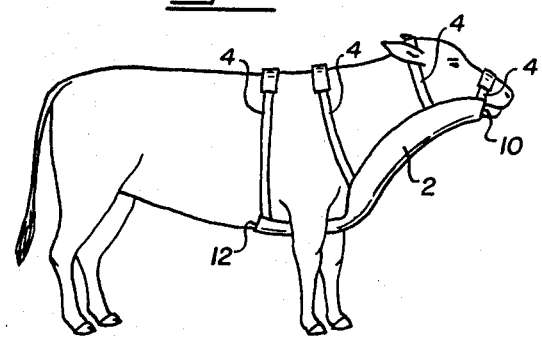
FIG. 2 is a plan view of a further embodiment to the invention shown in position on an animal.

The drawings illustrate a neck protector for an animal comprising a member 2 to extend on the underside of the animal, as shown in FIG. 2, between the fore legs of the animal to adjacent the mouth. The member is able to extend partially around the neck of the animal, again as illustrated in FIG. 2, to protect the windpipe during roping.

The member is provided with attachment means in the form of straps 4. In the FIG. 1 embodiment the straps 4 are provided with buckles 6 at one end and with holes 8 at the other end. The straps are used in conventional manner. That is prongs of the buckles 6 engage in the holes 8 to retain the protector in position on an animal as shown in FIG. 2. As a minimum requirement the protector must have the front strap that goes around the head of the animal and the rear strap that goes around the body. At least one neck strap is desirable and the preferred arrangement of two neck straps is illustrated in FIG. 2.

Figure 1:
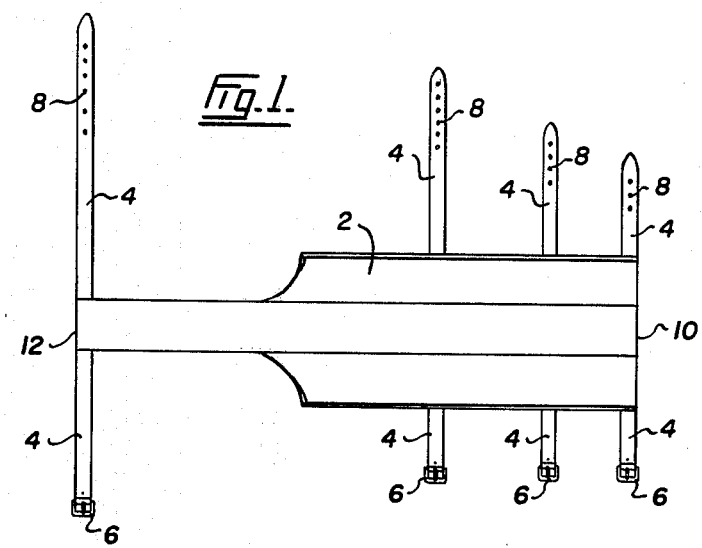
FIG. 1 is a plan view of one embodiment of the present invention.

The arrangement of FIG. 2 displaces the buckles of FIG. 1 and uses the hook and eye attachment available under the trade mark Velcro. With this embodiment one end of each strap is provided with hook members and the other end of the strap is provided with eye members. As is well known these hook and eye members are mutually engageable by simple pressing of the two parts together. A secure joint is provided.

The protector of the invention may be made of any material able to protect the animal, particularly the windpipe of the animal, during roping. In a particularly desirable embodiment a strip of neoprene of the shape shown in FIG. 1 and about $\frac{3}{8}$ inch thick has proved useful. However, relatively routine experiments would indicate a desirable thickness for any protective material.

In a useful embodiment the overall length of the protector, that is from leading edge 10 to trailing edge 12, is about 30 inches. The wider portion, to fit around the neck of the animal, may be about 20 inches wide and about 18 inches long.

We claim:

1. A neck protector for an animal to be roped the protector comprising:
   a flexible member comprising a first portion, relatively narrow, to extend substantially horizontally between the animal's fore legs and a second portion extending from the first portion and adapted to extend vertically and around the neck of the animal sufficiently to protect the animal's windpipe and to the mouth of the animal, under the jaws; said second portion being substantially wider than said first portion and having an inside smooth surface;
   a first strap at a first end of the flexible member to extend around the animal's body;
   a second strap at a second end of the flexible member to extend around the animal's nose; and
   at least one further strap to extend around the animal's neck the straps serving to locate the protector in position on the animal.

2. A protector as claimed in claim 1, in which the flexible material is rubber or neoprene.

3. A protector as claimed in claim 1 including two straps to go around the neck of the animal.

4. A protector as claimed in claim 1 in which the straps are belts, each having a buckle at one end and holes formed at the other to engage the buckle.

5. A protector as claimed in claim 1 in which the straps are provided with a plurality of hook members at one end and a plurality of corresponding eye members at the other end, the hooks and eyes being engageable by pressing them together.

* * * * *